No. 777,102. PATENTED DEC. 13, 1904.
W. S. HOWELL & W. C. McKENZIE.
COW MILKING MACHINE.
APPLICATION FILED SEPT. 18, 1903.
NO MODEL.
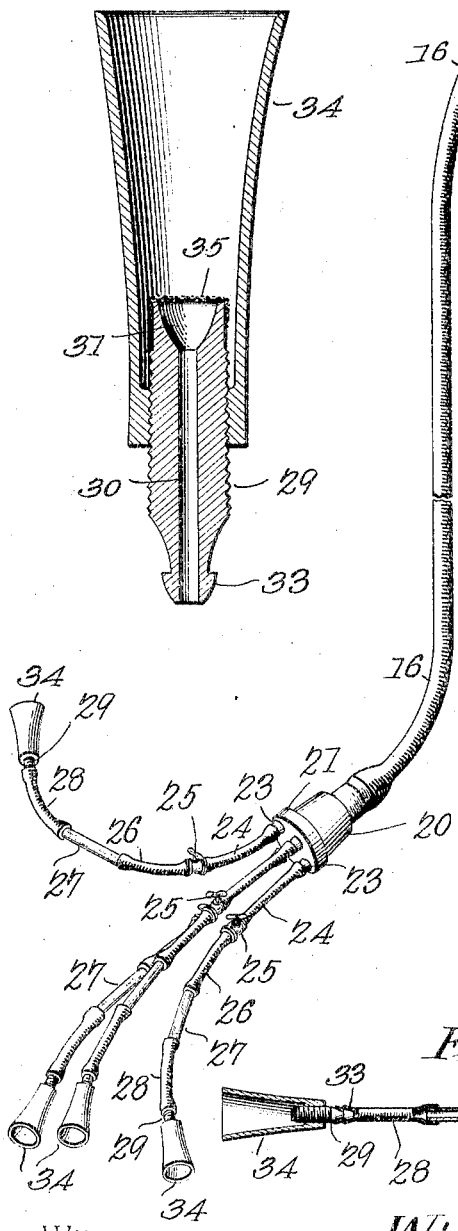
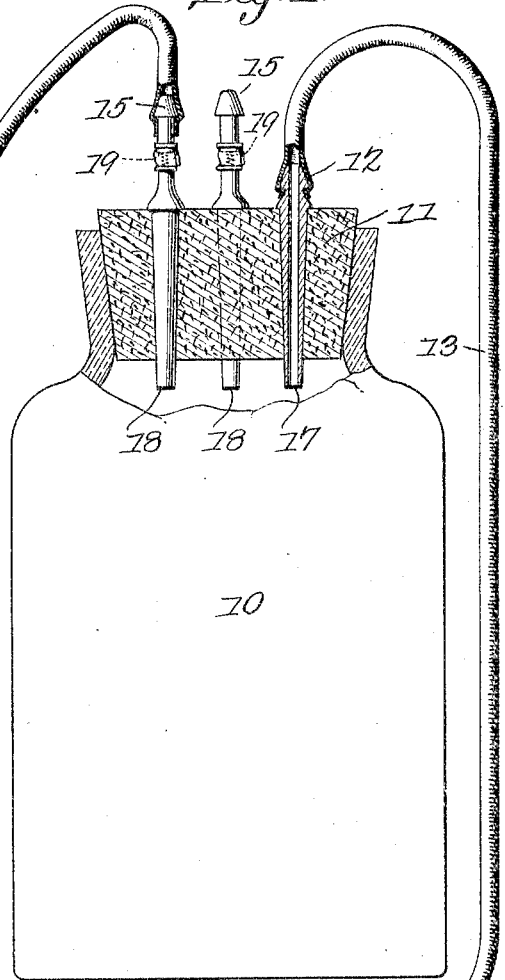
Will S. Howell and
William C. McKenzie, Inventors.
Witnesses No. 777,102.

Patented December 13, 1904.

UNITED STATES PATENT OFFICE.

WILL S. HOWELL AND WILLIAM C. McKENZIE, OF MOULTRIE, GEORGIA.

COW-MILKING MACHINE.

SPECIFICATION forming part of Letters Patent No. 777,102, dated December 13, 1904.

Application filed September 18, 1903. Serial No. 173,716. (No model.)

*To all whom it may concern:*

Be it known that we, WILL S. HOWELL and WILLIAM C. McKENZIE, citizens of the United States, residing at Moultrie, in the county of Colquitt and State of Georgia, have invented a new and useful Cow-Milking Machine, of which the following is a specification.

This invention relates to apparatus for milking cows, of the class more particularly wherein a vacuum is produced for drawing the milk from the cow, and has for its object to improve the devices of this character and produce an apparatus whereby the milk is drawn without causing discomfort to the cow or irritating the parts; and the invention consists in certain novel features of construction, as hereinafter shown and described, and specified in the claims.

In the drawings illustrative of the invention, in which corresponding parts are denoted by like designating characters, Figure 1 is a side elevation, partly in section, of the apparatus, representing in a general way the different features of the same. Fig. 2 is an enlarged sectional view of parts of the device illustrating this construction. Fig. 3 is an enlarged longitudinal sectional view of the teat-cup.

The improved device comprises a receptacle 10 for the milk, which may be of any size and located at any convenient point. The receptacle may be large enough to receive the milk from any number of cows or from one cow only, as required, and may be of any desired material, but will preferably be of glass or similar material or compound.

The receptacle 10 is provided with a detachable cover 11 of suitable form, adapted for ready and frequent cleansing, and to this end will preferably be of material which will not be affected by or deleteriously affect the milk, such as hard rubber or the like, and will fit the mouth or neck of the receptacle air-tight, as indicated. The cover member is provided with a nipple 12 to support the hose 13 of an exhaust-pump 14, by which a vacuum may be produced in the receptacle. The cover member 11 is also provided with one or more nipples 15 to support flexible conduits 16, one of the conduits being provided for each cow to be milked. If the apparatus is to be employed for milking but one cow, the receptacle will be only large enough to receive one cow's milk, but will be proportioned, as above noted, to the number of cows with which it is to be associated. The cover member 11 will therefore be provided with as many of the nipples 15 as there are cows to be milked by the single apparatus.

The nipples 12 15 will be respectively connected to tubular extensions 17 18, fitting the cover member air-tight and detachable for the purpose of cleansing. Each of the tubular portions 18 will be provided with a check-valve 19 to prevent the "breaking" of the vacuum.

The pump 14 will be of any suitable form, and as the construction of the pump forms no part of the present invention it is not further illustrated.

The conduits 16 each lead to a concentration-chamber 20, (only one being shown,) the chamber having a detachable cover 21 and a nipple 22 for the connection of the conduit 16, as shown. The cover 21 is shown attached by a screw-thread, which is the preferred method, but may be otherwise secured, if preferred.

Extending from the cover 21 of the concentrating-chamber 20 are four nipples 23, one for each of the cow's teats and from which flexible tubular sections 24 extend to stop-valves 25, and from the opposite side of the stop-valves flexible tubular sections 26 extend to tubular glass sections 27, and from the opposite ends of the glass sections flexible tubular sections 28 extend to the threaded plugs 29, the latter having longitudinal apertures 30 terminating in an enlargement or recess 31 in their free ends. The stop-valves 25 and plugs 29 are provided, respectively, with nipples 32 33 to provide for the detachable connection of the flexible sections, as shown.

Connected adjustably to the plugs 29 are the teat-cups 34, formed of inflexible material, such as hard metal or other material, which will not be injurious to the cow and which may be readily cleansed. The cups are formed relatively large at their free ends and gradually converge toward their inner ends and internally threaded, as shown, to receive the plugs 29. The sides of the cup are preferably curved longitudinally, as shown, with the interior diameter of the smaller end corresponding to the teats of the cow, so that when applied to their lower ends will just fill the interior of the cup. To this end cups of various sizes will be furnished to adapt the device to cows of different sizes. The plugs 29 will be provided with gauze diaphragms 35, which the ends of the teats will engage when the cup is applied. By forming the cup member converging interiorly, with the smaller part closely conforming to the size of the teat, the larger free end for close engagement with the udder, and the interior of the cup slightly larger than the normal size of the teat, when the air is exhausted the teat will expand and completely fill the interior of the cup and form a natural packing to prevent the entrance of air, while at the same time correspondingly expanding the milk-duct and insuring the free flow of the milk from the udder.

The feature of an inflexible cup having an internal area slightly greater than that of the normal teat has an important advantage over the usual soft-rubber or flexible cup, for the reason that the latter contracts upon the teat and tends to close the milk-duct, while the present form of cup does not contract, but permits the teat and the milk-duct to expand, thereby insuring a free and unrestricted flow of the milk. To this end the gauze member 35 is an important feature, as it forms a stop to the teat and insures the more certain expansion of the same when the air exhaustion occurs, and by providing means for adjusting the gauze member longitudinally of the cup the former can be properly positioned relative to the teat, and thus adapt the device to the various sizes encountered.

By means of the transparent section 27 and stop-valve 25 in each of the branch conduits the progress of the milking may be observed and controlled, so that when the flow ceases the "suction" may be shut off to avoid irritating the cow. By this means also when the milk ceases to flow through one or more of the teats it may be shut off and the action continued through the remaining ones. By this simple means the flow can be perfectly controlled and unnecessary suction avoided.

It will be noted that every portion of the apparatus is readily separable, so that they can be thoroughly cleansed, and no opportunity remains for the lodgment of particles of matter to deteriorate the milk. Another advantage gained by forming the parts easily separable is that in event of the breakage or wearing of any part it may be easily and cheaply replaced without affecting the remaining parts.

The device is simple in construction, easily applied and operated, and will not injure the cow or subject her to annoyance or irritate her.

In the foregoing description is shown the preferred form of the invention, but is not necessarily limited thereto, as modifications may be made therein without departing from the principle of the invention or sacrificing any of its advantages, and the right is therefore reserved of making all changes which may fairly fall within the scope of the invention and the claims made therefor.

Having thus described the invention, what we claim is—

1. A teat-cup of inflexible material internally tapered longitudinally with the smaller internal diameter conforming to the teat of the cow, and means operating within said cup for engaging the tip of the teat and controlling its longitudinal position within the cup.

2. A teat-cup of inflexible material internally tapered longitudinally with the smaller internal diameter conforming to the teat of the cow, and a gauze diaphragm disposed within said cup, and adjustable to normally engage the tip of the teat and limit its downward movement.

3. A teat-cup of inflexible material internally tapered longitudinally with the smaller internal diameter conforming to the teat of the cow, a plug adjustably connected into the smaller end of said cup and provided at its outer end with a nipple, and a gauze closure for the inner end of said plug, substantially as described.

4. A teat-cup of inflexible material internally tapered longitudinally with the smaller internal diameter conforming to the teat of the cow, a plug connected into the smaller end of said cup, said plug having a longitudinal aperture flared at the inner end, and a gauze closure for said flared end, substantially as described.

5. A teat-cup having a cross-sectional area to snugly fit a teat when under suction and provided with a tubular plug piercing the rear end of the cup, the inner end of the plug constituting a teat-stop and its outer end being provided with a nipple for engagement with a suction-conduit, the cup being removable in an endwise direction outwardly from the plug.

6. A teat-cup having a cross-sectional area to snugly fit a teat when under suction, and provided in its closed end with a screw-threaded opening, and an endwise-adjustable tubular plug having an externally-screw-threaded part adjustably fitting the screw-threaded opening of the cup, the inner end of the plug constituting a teat-stop and its outer end having a nipple for the attachment of a suction-conduit, the inner portion of the plug having a diameter to pass through the opening in the cup and the latter endwise removable in an outward direction from the plug.

In testimony that we claim the foregoing as our own we have hereto affixed our signatures in the presence of two witnesses.

WILL S. HOWELL.
WILLIAM C. McKENZIE.

Witnesses:
J. D. McKENZIE,
R. G. CLARK.